United States Patent
Maynard

(10) Patent No.: US 10,213,842 B2
(45) Date of Patent: Feb. 26, 2019

(54) METHOD FOR ACHIEVING LENGTH ACCURACY OF DIAMOND TURNED PARTS

(71) Applicant: Spy Eye, LLC, Los Gatos, CA (US)

(72) Inventor: Ronald S. Maynard, Austin, TX (US)

(73) Assignee: Spy Eye, LLC, Palo Alto, CA (US)

( * ) Notice: Subject to any disclaimer, the term of this patent is extended or adjusted under 35 U.S.C. 154(b) by 0 days.

(21) Appl. No.: 15/890,597

(22) Filed: Feb. 7, 2018

(65) Prior Publication Data

US 2018/0229312 A1   Aug. 16, 2018

Related U.S. Application Data

(60) Provisional application No. 62/457,320, filed on Feb. 10, 2017.

(51) Int. Cl.
| | |
|---|---|
| *B23B 31/30* | (2006.01) |
| *B23B 25/06* | (2006.01) |
| *B23B 5/36* | (2006.01) |
| *B23B 1/00* | (2006.01) |

(52) U.S. Cl.
CPC ............. *B23B 31/307* (2013.01); *B23B 1/00* (2013.01); *B23B 5/36* (2013.01); *B23B 25/06* (2013.01); *B23B 2226/125* (2013.01); *B23B 2226/31* (2013.01); *B23B 2226/315* (2013.01); *B23B 2226/61* (2013.01); *B23B 2233/16* (2013.01); *B23B 2260/0725* (2013.01)

(58) Field of Classification Search
CPC ............. H01L 21/6838; Y10T 279/11; B23B 2226/31; B23B 31/307; B23B 5/36
See application file for complete search history.

(56) References Cited

U.S. PATENT DOCUMENTS

| | | | | |
|---|---|---|---|---|
| 2,366,935 A | * | 1/1945 | Schmid | B23B 31/307 101/407.1 |
| 2,843,389 A | * | 7/1958 | Sloan | B23B 31/1223 279/127 |
| 2,852,264 A | * | 9/1958 | Granata | B23B 31/307 279/3 |
| 3,454,282 A | * | 7/1969 | Boulton | B21D 51/46 118/55 |

(Continued)

FOREIGN PATENT DOCUMENTS

| | | | | |
|---|---|---|---|---|
| GB | 2550828 A | * | 11/2017 | ........... B23B 31/307 |
| JP | 60263603 A | * | 12/1985 | ........... B23B 31/307 |

*Primary Examiner* — Sara Addisu
(74) *Attorney, Agent, or Firm* — Fenwick & West LLP

(57) ABSTRACT

A temporary part is mounted onto the chuck of the diamond turning machine. A diamond turning tip of the diamond turning machine is used to form a reference surface on the temporary part, registering a baseline for a motion control system of the diamond turning machine. While the temporary part remains mounted to the diamond turning machine, a workpiece is mounted onto the temporary part, and the diamond tip is controlled relative to the reference surface to diamond turn a surface profile on the workpiece. Because the baseline established by the reference surface compensates for positional variations from mounting parts directly onto the chuck of the diamond turning machine, the length of the workpiece can be shaped to a designated length with a high degree of accuracy.

20 Claims, 8 Drawing Sheets

(56) References Cited

U.S. PATENT DOCUMENTS

| | | | | |
|---|---|---|---|---|
| 4,183,545 A * | 1/1980 | Daly | ............... | B23B 31/307 269/21 |
| 4,603,867 A * | 8/1986 | Babb | ............... | B23B 31/307 264/DIG. 78 |
| 5,423,716 A * | 6/1995 | Strasbaugh | ............... | B23B 31/307 269/21 |
| 5,445,052 A * | 8/1995 | Nichols, Jr. | ............... | B23B 31/307 142/55 |
| 5,485,771 A * | 1/1996 | Brennan | ............... | B23Q 1/0009 82/1.11 |
| 5,743,685 A * | 4/1998 | Piggott | ............... | B25B 11/005 269/21 |
| 5,861,114 A * | 1/1999 | Roffman | ............... | B29C 33/306 264/1.1 |
| 5,868,401 A * | 2/1999 | Darcy, III | ............... | B25B 11/007 269/3 |
| 6,758,640 B2 * | 7/2004 | Mizutani | ............... | G05B 19/4015 324/133 |
| 6,767,018 B1 * | 7/2004 | Daniels | ............... | B23Q 3/18 269/21 |
| 7,413,689 B2 | 8/2008 | Tolley et al. | | |
| 7,434,299 B1 * | 10/2008 | Gill | ............... | B23B 31/307 29/26 A |
| 7,488,145 B2 * | 2/2009 | Watanabe | ............... | B28D 1/041 279/3 |
| 8,100,413 B2 * | 1/2012 | Otaguro | ............... | B25J 15/0616 279/3 |
| 2002/0197122 A1 * | 12/2002 | Mizutani | ............... | G05B 19/4015 409/132 |
| 2008/0146124 A1 * | 6/2008 | Morita | ............... | B23B 31/307 451/289 |
| 2010/0270694 A1 * | 10/2010 | Meyers | ............... | B23B 31/10 264/2.7 |
| 2013/0255453 A1 * | 10/2013 | Buck | ............... | B25B 11/005 82/1.11 |
| 2014/0091537 A1 * | 4/2014 | Iizuka | ............... | B23B 31/307 279/3 |
| 2015/0375355 A1 * | 12/2015 | Collins | ............... | B23B 1/00 82/1.11 |
| 2018/0065187 A1 * | 3/2018 | Yamamoto | ............... | B23B 31/307 |
| 2018/0200868 A1 * | 7/2018 | Ross | ............... | B25B 11/005 |
| 2018/0243839 A1 * | 8/2018 | Wielandts | ............... | B23B 31/28 |

* cited by examiner

METHOD FOR ACHIEVING LENGTH ACCURACY OF DIAMOND TURNED PARTS

CROSS-REFERENCE TO RELATED APPLICATION(S)

This application claims priority under 35 U.S.C. § 119(e) to U.S. Provisional Patent Application Ser. No. 62/457,320, titled "Method for Achieving Length Accuracy of Diamond Turned Parts," filed on Feb. 10, 2017, the subject matter of which is incorporated herein by reference in its entirety.

BACKGROUND

1. Technical Field

This invention generally relates to manufacturing using diamond turning techniques, and in particular using diamond turning to manufacture components having a desired thickness with a high degree of precision.

2. Description of Related Art

Diamond turning is a machining technique commonly used to make ultra-precise parts such as small optical lenses and mirrors. For example, single-point diamond turning involves guiding an atomically sharp diamond tip over a rotating workpiece in a CNC (computer numerically controlled) lathe.

Conventional diamond turning techniques are typically able to achieve a length accuracy of only about ±10 um (microns). This level of accuracy may not be sufficient when manufacturing components where length accuracy is critical, such as certain types of small optical components.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

On modern diamond turning machines, the relative position of the diamond turning tip is able to be controlled with high precision (e.g., nanometer-level precision), allowing for the surfaces of workpieces to be shaped with a surface form error as small as about ±100 nm. However, when a workpiece is mounted directly to the chuck of a diamond turning machine, the position of the workpiece on the chuck relative to the diamond turning tip may not be sufficiently accurate to enable shaping of the workpiece to a desired length with a desired tolerance level (e.g., less than ±1 um).

Methods for achieving length accuracy of diamond turned parts as described below have been demonstrated to produce parts with length tolerances of ±1 um or better. The methods are based on using a diamond turning tip of a diamond turning machine to form a reference surface on a temporary part mounted on the diamond turning machine, in order to register a baseline for a motion control system of the diamond turning machine. The workpiece is then shaped based upon the reference surface. Because neither the temporary part on which the reference surface is formed nor the diamond turning tip used to form the reference surface are changed during the machining process, the baseline for the relative position of the diamond turning tip established by the reference surface is maintained throughout the shaping of the workpiece, allowing for the overall length or thickness of the workpiece to be machined with a high degree of accuracy. In some cases, the workpiece may be diamond turned and then flipped over so that the opposite side of the workpiece can also be diamond turned. By establishing a baseline using a reference surface diamond turned on a temporary part, high length accuracy can be achieved as long as the baseline is maintained (e.g., the temporary part and diamond turning tip used to form the reference surface remain the same throughout the diamond turning of the workpiece).

The methods described herein may be used with a variety of different types of diamond turning machines. An example of a state-of-the art diamond turning machines suitable for performing the processes and methods described below is the Nanotech 250 UPL V2 ultra-precision, two-axis, CNC diamond turning lathe made by Moore Nanotechnology Systems (Swanzey, N.H.).

Figure 1:
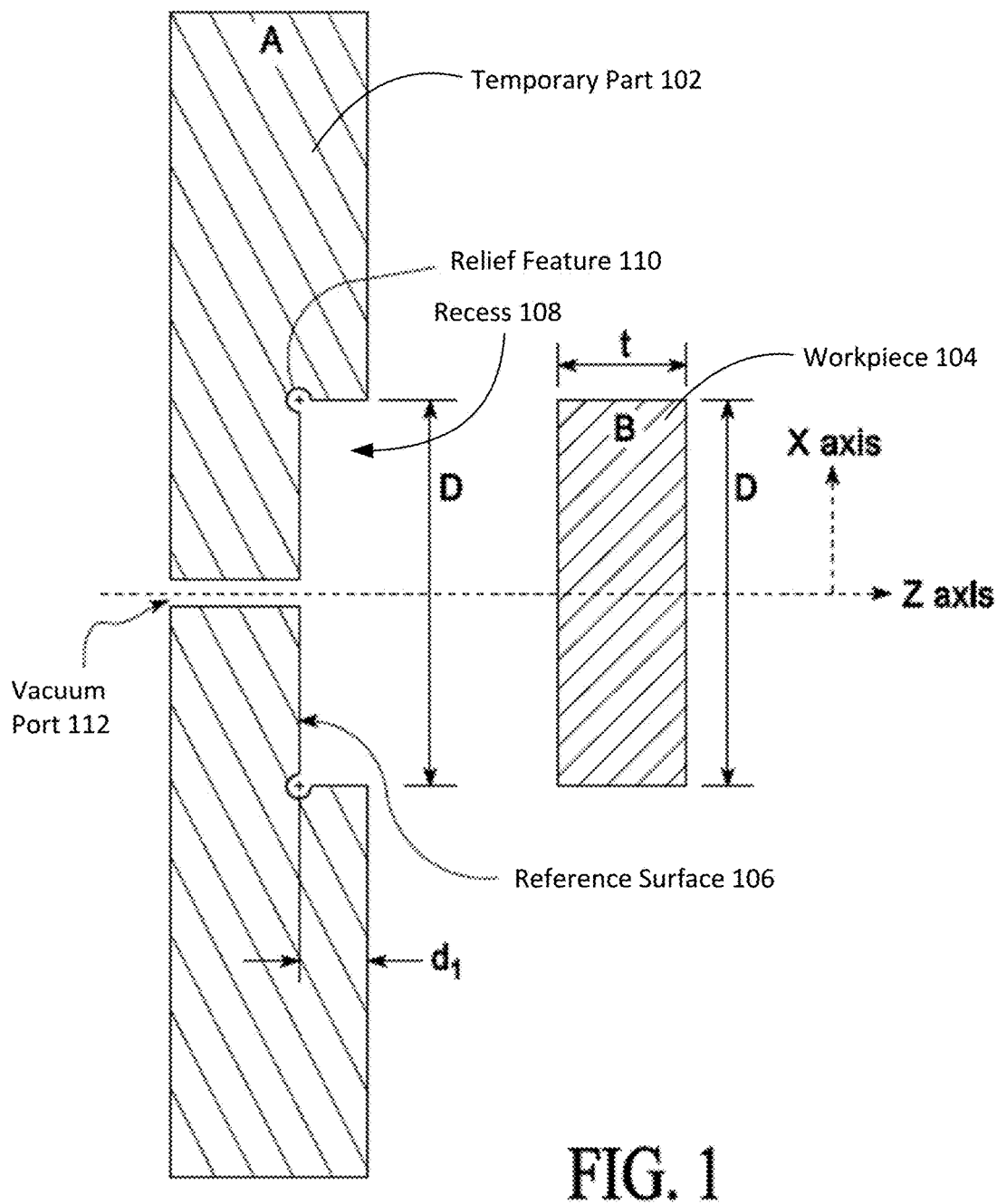
FIGS. 1-3 illustrate steps for a first diamond turning process for shaping a workpiece to a desired length.
Figure 2:
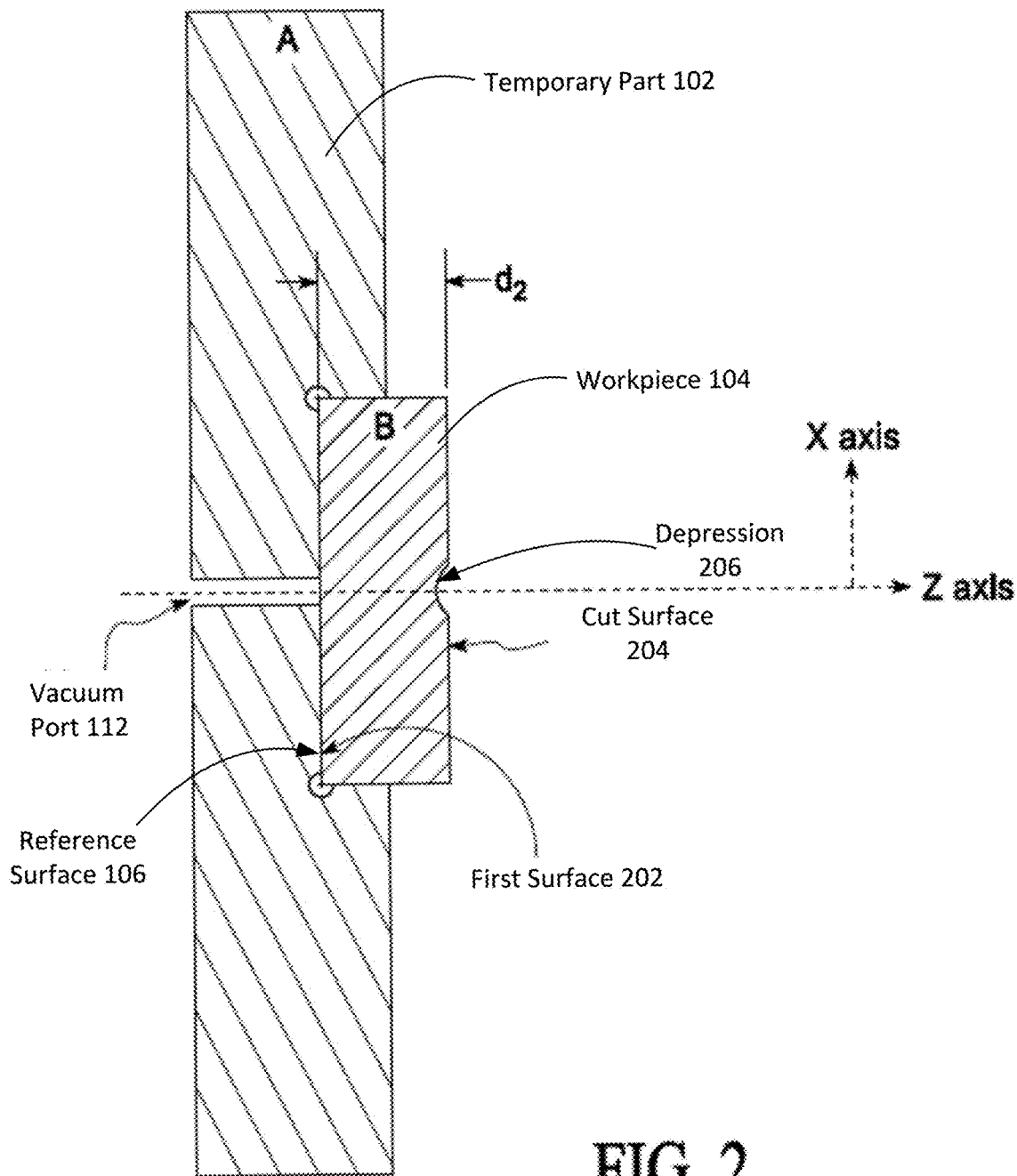
Figure 3:
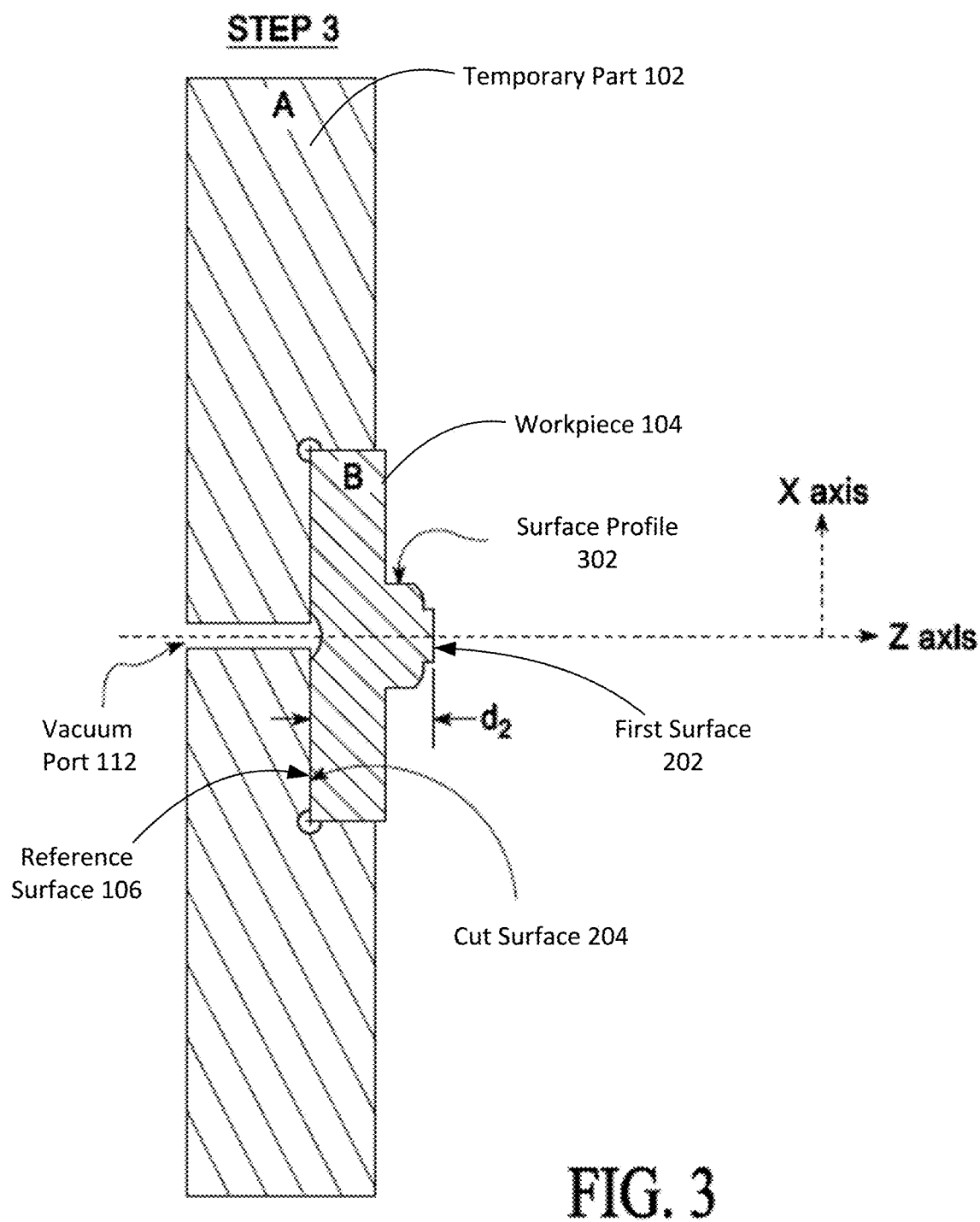

FIGS. 1-3 illustrate steps for a first diamond turning process for shaping a workpiece to a desired length with a tolerance of ±1 um or better. Each of the FIGS. 1-3 illustrate cross-sections of a temporary part 102 and a workpiece 104. The temporary part 102 is mounted on and remains mounted on a chuck for a diamond turning machine (not shown) throughout the entirety of the process. The diamond turning machine rotates the chuck and temporary part 102 around the axis of rotation (the Z-axis in FIG. 1). In some embodiments, the temporary part 102 and the workpiece 104 are each made from poly(methyl methacrylate), also known as acrylic, Plexiglas®, and/or PMMA. However, the temporary part 102 and the workpiece 104 may be made of any material that can be machined by diamond turning. In some embodiments, other types of turning tips made from material capable of forming an atomically sharp tip may be used. For ease of discussion, diamond turning as used herein may encompass turning tips that use diamond, cubic boron nitride (c-BN), sapphire, titanium nitride, tungsten nitride, synthetic jewels (e.g., formed through chemical vapor deposition (CVD)) or other similar materials capable of forming an atomically sharp tip.

FIG. 1 illustrates a first step of the diamond turning process, where a reference surface 106 is formed on the temporary part 102 mounted on the diamond turning machine. The reference surface 106 is formed using a diamond turning tip (not shown) of the diamond turning machine, and may be oriented to be substantially perpendicular to the axis of rotation for the diamond turning (i.e., the Z-axis). The reference surface 106 establishes a baseline for the relative position of the diamond turning tip. The baseline remains valid as long as neither the temporary part 102 nor the diamond turning tip are removed or damaged.

In some embodiments as shown in FIG. 1, the diamond turning tip forms the reference surface 106 as part of a recess 108 on a surface of the temporary part 102. The recess 108 may be a cylindrical hole having a bottom surface of diameter D and sidewalls of depth d1. The reference surface 106 is the bottom surface of the recess 108. The depth d1 of the recess 108 may be selected to be less than a desired thickness of the workpiece 104 after machining. In some embodiments, the sidewalls of the recess are formed to be substantially parallel to the Z-axis. Corner relief features 110 may be formed at a junction of the bottom and sidewalls of the recess 108.

In some embodiments, a vacuum port 112 extends through the temporary part 102 to the reference surface 106. For example, where the chuck of the diamond turning machine is a vacuum chuck, the temporary part 102 is mounted to the vacuum chuck by the suction of the vacuum chuck. The vacuum port 112 extends the suction of the vacuum chuck to the reference surface 106, allowing for the workpiece 104 to be mounted onto the temporary part 102 by suction through the vacuum port 112 (see FIG. 2). In some embodiments, the vacuum port 112 is aligned with the axis of rotation of the diamond turning machine (i.e., the Z-axis). In some embodiments, the vacuum port 112 is drilled into the temporary part 102 while the temporary part 102 is mounted on the diamond turning lathe.

In some embodiments, the diamond turning tip is used to form one or more grooves on the reference surface 106 and connected to the vacuum port 112, for carrying suction from the vacuum port 112 to portions of the workpiece 104 off the Z-axis. The one or more grooves may comprise a spiral groove.

Figure 8:
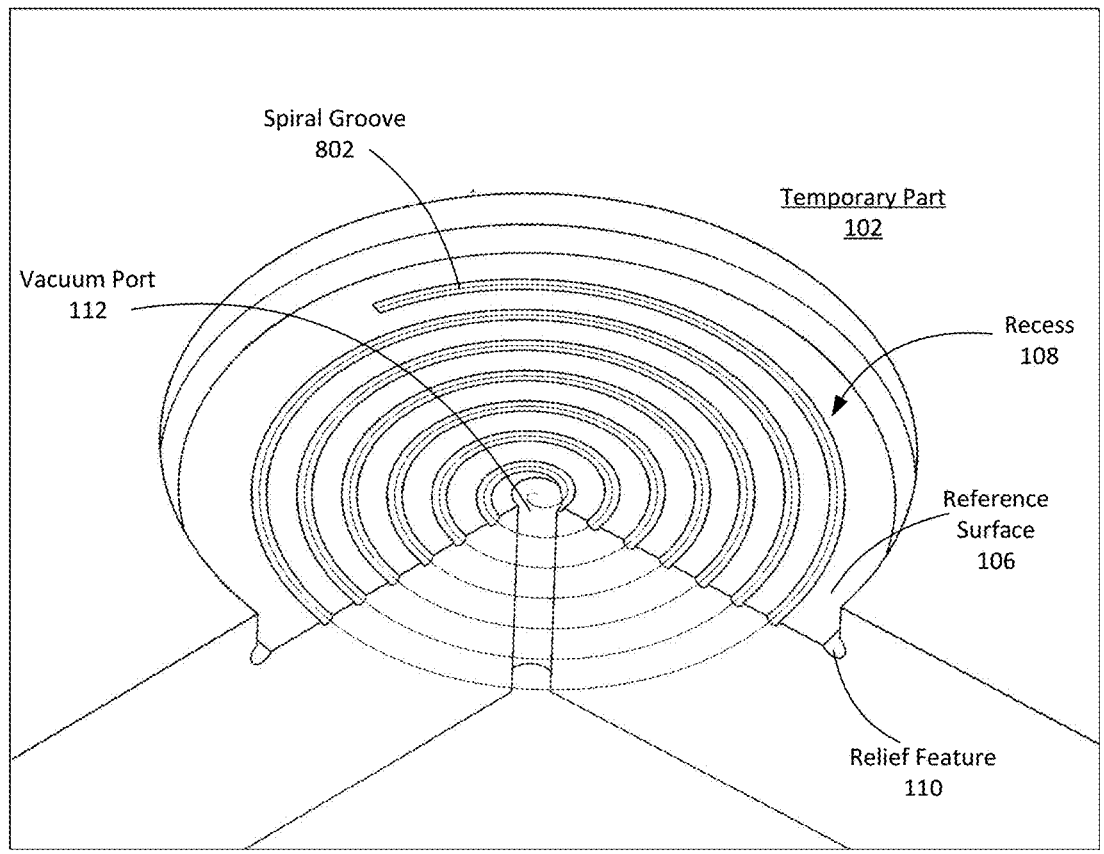
FIG. 8 illustrates an example of a spiral groove that may be formed on a reference surface for holding a workpiece by vacuum.

FIG. 8 illustrates an example of a spiral groove formed on a reference surface. As illustrated in FIG. 8, the reference surface 106 is the bottom surface of the recess 108 formed on the temporary part 102, and the vacuum port 112 is formed at the center of the reference surface 106. The spiral groove 802 connects to the vacuum port 112 formed in the center of the reference surface 106, allowing for suction through the vacuum port 112 to be applied to areas of the workpiece 104 away from the Z-axis. A spiral groove may be selected due to being relatively easy to form (e.g., in comparison to other types of grooves such as a spider-web groove), while also having a good coverage of the reference surface 106.

As shown in FIG. 2, the workpiece 104 is mounted onto the temporary part 102, such that one surface 202 of the workpiece 104 contacts the reference surface 106 formed on the temporary part 102. In embodiments where the reference surface 106 is formed as a bottom surface of the recess 108, the workpiece 104 is shaped (e.g., a circular shape of diameter D) to fit within the recess 108. In addition, the workpiece 104 may have an initial thickness t that is greater than the depth d1 of the recess 108. The sidewalls of the recess 108 function to laterally position and orient the workpiece 104 relative to the temporary part 102 and therefore also relative to the diamond turning machine.

Concentricity is the degree to which the axis of symmetry of one side of a turned part coincides with the axis of symmetry of the other side of the part. The concentricity of workpiece 104 may depend on how accurately the workpiece 104 is mounted on the temporary part 102. In some embodiments, an insertion clearance of less than 0.5 um between the sides of the workpiece 104 and the sidewalls of the recess 108 is preferable. In some embodiments, when the temporary part 102 and workpiece 104 are made of different materials with different coefficients of thermal expansion (CTE), controlled temperature changes can be employed to make an interference fit. For example, if temporary part 102 has larger CTE than the workpiece 104, then heating the parts makes the workpiece 104 fit more easily in the temporary part 102, while cooling tightens the fit.

In some embodiments, depending on what materials the temporary part 102 and workpiece 104 are made from, alternatives to vacuum suction may be employed to hold the workpiece 104 on the temporary part 102. For example, the two parts may be held together magnetically, electrostatically, and/or via interference (e.g., thermal-mechanical interference).

FIG. 2 illustrates the workpiece 104 after it has been mounted to the temporary part 102. Mounting the workpiece 104 to the temporary part 102 may comprise inserting the workpiece 104 into the recess 108, such that a first surface 202 of the workpiece 104 aligns with and is directly adjacent to the reference surface 106. In some embodiments, the first surface 202 of the workpiece 104 may have been previously diamond turned or shaped to form a flat surface to align with the reference surface 106.

After the workpiece 104 is mounted to the temporary part 102, the diamond turning tip of the diamond turning machine forms a surface profile on the surface of the workpiece 104 opposite from the first surface 202 to form a cut surface 204. Using the baseline established by the reference surface 106, the diamond turning tip is able to shape the cut surface 204 of the workpiece 104 to be a specified distance d2 from the reference surface 106 (and first surface 202) with a high degree of precision (e.g., within ±1 um).

In some embodiments, d2 corresponds to the critical length dimension of the workpiece 104, and is formed with a tolerance of ±1 um or less. In an example part, D=3 mm, t=1 mm, d1=200 um, and d2=765.521 um±0.5 um. The cut surface 204 may comprise one or more surface features, such as a small depression 206 around the z axis, while maintaining overall length d2 of the workpiece 104. For example, the diamond turning point may, in a first pass, form a flat cut surface 204 on the workpiece 104, and then perform one or more subsequent passes to form surface features onto the cut surface 204, such as the depression 206.

In some embodiments, it is desired to shape the workpiece 104 on both sides (e.g., on the first surface 202 and the cut surface 204) while maintaining a specified distance d2 between the first surface 202 and the cut surface 204. To do so, the workpiece 104 is separated from the temporary piece 102 and reoriented such that the cut surface 204 is mounted to the reference surface 106. Between the time in which the workpiece 104 is removed from the temporary part 102 and remounted to the temporary part 102, the reference surface 106 may be cleaned in order to remove any debris or contaminants that may have been deposited on the reference surface 106.

FIG. 3 illustrates the workpiece 104 after it has been removed and remounted to the temporary part 102. The cut surface 204 is in contact with the reference surface 106, whereas the first surface 202 faces outwards towards the diamond turning tip. In some embodiments, the depression 206 formed on the cut surface 204 aligns with the vacuum port 112 in order to improve the suction through the vacuum port 112 holding the workpiece 104 onto the temporary part 102.

The diamond turning tip cuts one or more features onto the outward-facing first surface 202 of the workpiece 104 to form a surface profile 302. In some embodiments, the surface profile 302 is formed on the workpiece 104 while maintaining overall part length d2 between the cut surface 204 and the first surface 202. As such, both the first surface 202 and the cut surface 204 of the workpiece 104 are shaped while maintaining the critical length d2 between the cut surface 204 and the first surface 202. In other embodiments, the diamond turning tip cuts a new first surface into the workpiece 104 that does not maintain the length d2, but instead defines a new workpiece thickness. Because the baseline defined by the reference surface 106 remains constant throughout the process, the new workpiece thickness can be defined with a high degree of precision. When the surface profile 302 is complete, the workpiece 104 is released from temporary part 102 (e.g., by removing the suction applied via the vacuum port 112).

Because the temporary part 102 is not removed from the diamond turning machine and the diamond turning tip also is not removed or damaged, the relative position of the reference surface 106 along the Z-axis is known to very high precision (e.g., <0.1 nm). The reference surface 106 thus functions as a baseline allowing for the diamond turning tip to shape the workpiece 104 to a specified thickness, taking advantage of the high relative positional accuracy of the diamond turning tip.

Although the description above primarily discusses shaping a workpiece to form a component with a particular length d2, the establishment of the reference surface 106 baseline allows for any length of the workpiece 104 (i.e., any profile in the X-Z plane) to be turned with accuracy commensurate with the X-axis surface form error (e.g., as good as about ±1 nm for a state-of-the-art machine), depending on materials used.

FIGS. 4-7 illustrate an example of a second diamond turning process that may be used to shape a workpiece that is machined on all sides, instead of being restricted to the dimensions of the recess 108 formed on the temporary piece 102.

Figure 4:
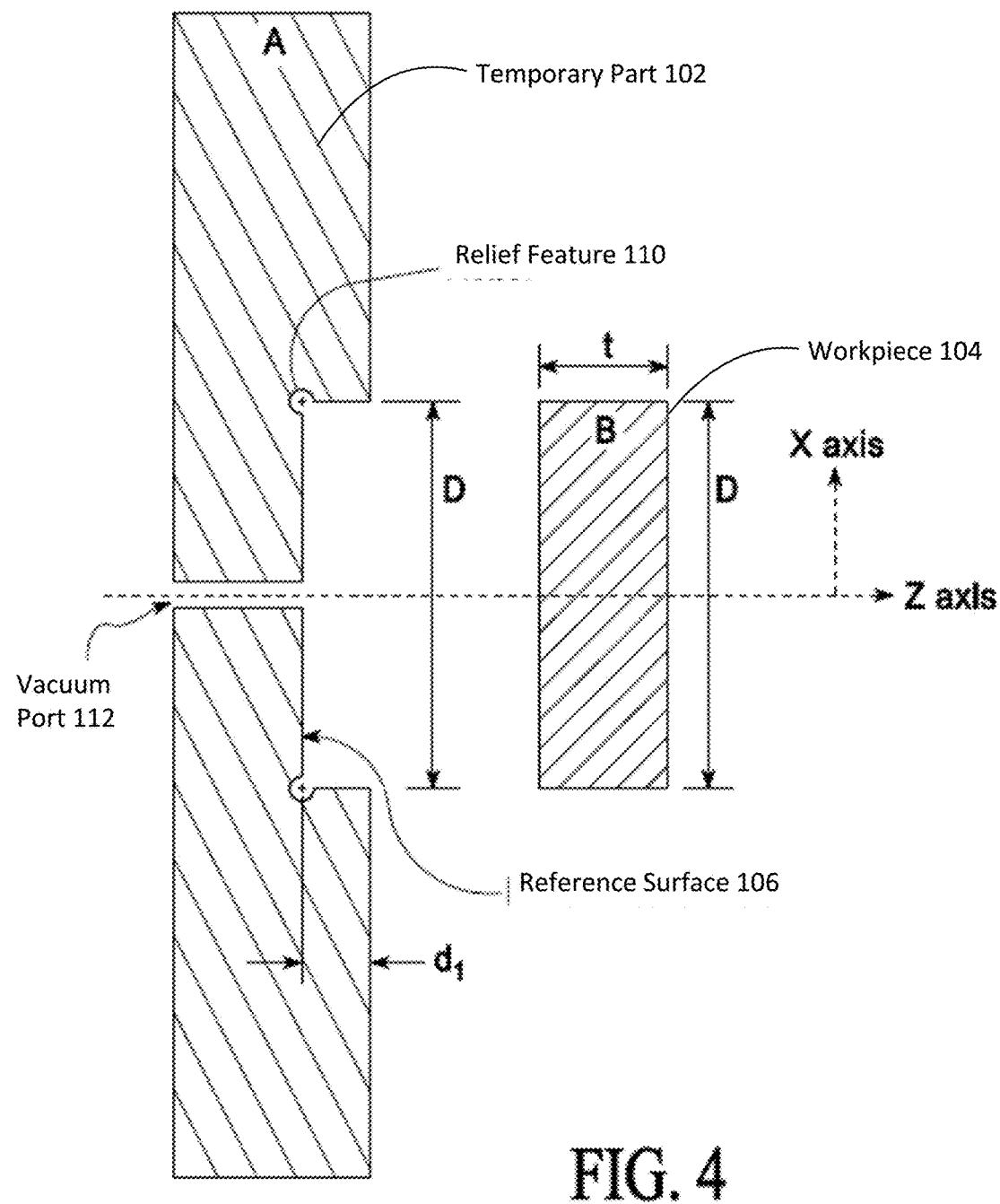
FIGS. 4-7 illustrate an example of a second diamond turning process that may be used to shape a workpiece that is machined on all sides.

FIG. 4 illustrates a first step of the second diamond turning process, which is similar to the first step of FIG. 1. The temporary part 102 is mounted to a diamond turning machine (not shown), with Z-axis as the rotation axis. A diamond turning tip of the diamond turning machine forms the reference surface 106 on the temporary part 102.

As in FIGS. 1-3, so long as the temporary part 102 is not removed from the diamond turning machine, and the diamond turning tip is not removed or damaged, the relative position of the reference surface 106 along the Z-axis is known to very high precision (e.g., <0.1 nm), serving as a baseline for shaping the workpiece 404 and ensuring that the overall length of the workpiece 104 can be shaped with good precision.

Figure 5:
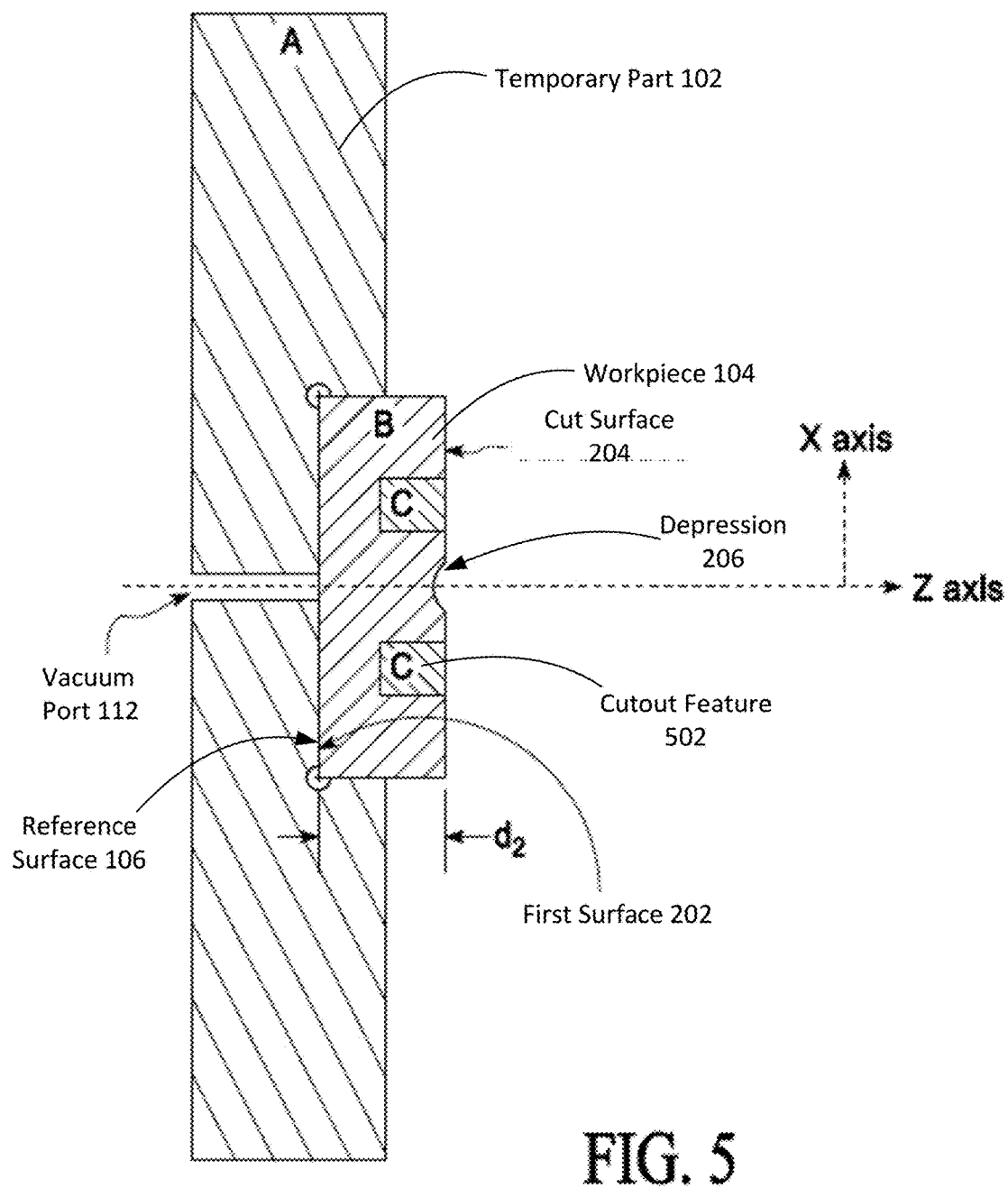

FIG. 5 illustrates the workpiece 104 after mounting to the temporary part 102 such that the first surface 202 of the workpiece 104 is directly adjacent to the reference surface 106, as part of the second diamond turning process. The workpiece 104 may be held in place on the temporary part 102 by suction applied through the vacuum port 112. The diamond turning tip of the diamond turning machine shapes a cut surface 204 on the workpiece opposite from the first surface 202. Using the reference surface 106 as a baseline, the diamond turning tip is able to form the cut surface 204 at a designated distance d2 away from the first surface with a high degree of precision (e.g., within ±1 um).

In addition, the diamond turning tip forms, on the cut surface 204, one or more cutout features 502, based upon a desired side profile/shape of the workpiece 104. Although FIG. 5 illustrates the cross-section view of the cutout features 502 appearing as two different recesses formed on the cut surface 204, in some embodiments, the cutout features 502 comprise a concentric groove formed around the center of the cut surface 204 (i.e., Z-axis) and surrounding a center portion of the workpiece 104. The cutout features 502 are filled with a filler material, which may comprise poly(vinyl alcohol) (PVA), a water-soluble synthetic polymer, other type of curable, soluble material. The filler material may be any type of material that can be inserted into the cutout features 502 that is rigid enough to support the structure of the workpiece 104, and able to later removed without damaging the workpiece 104. The depth of each cutout feature 508 may be roughly half of d2.

In some embodiments, the diamond turning tip first forms the cutout features 502 on the workpiece 104, which are then filled with the filler material. Subsequent to the forming and filling of the cutout features 502, the diamond turning tip subsequently shapes the cut surface 204 at the critical length d2, as well as any additional features on the cut surface (such as the depression 206). By forming and filling the cutout features 502 prior to forming the cut surface 204, the filler material can be planarized by the diamond turning tip such that it aligns with the cut surface 204, and does not protrude from the cutout features 502 past the critical length d2.

Figure 6:
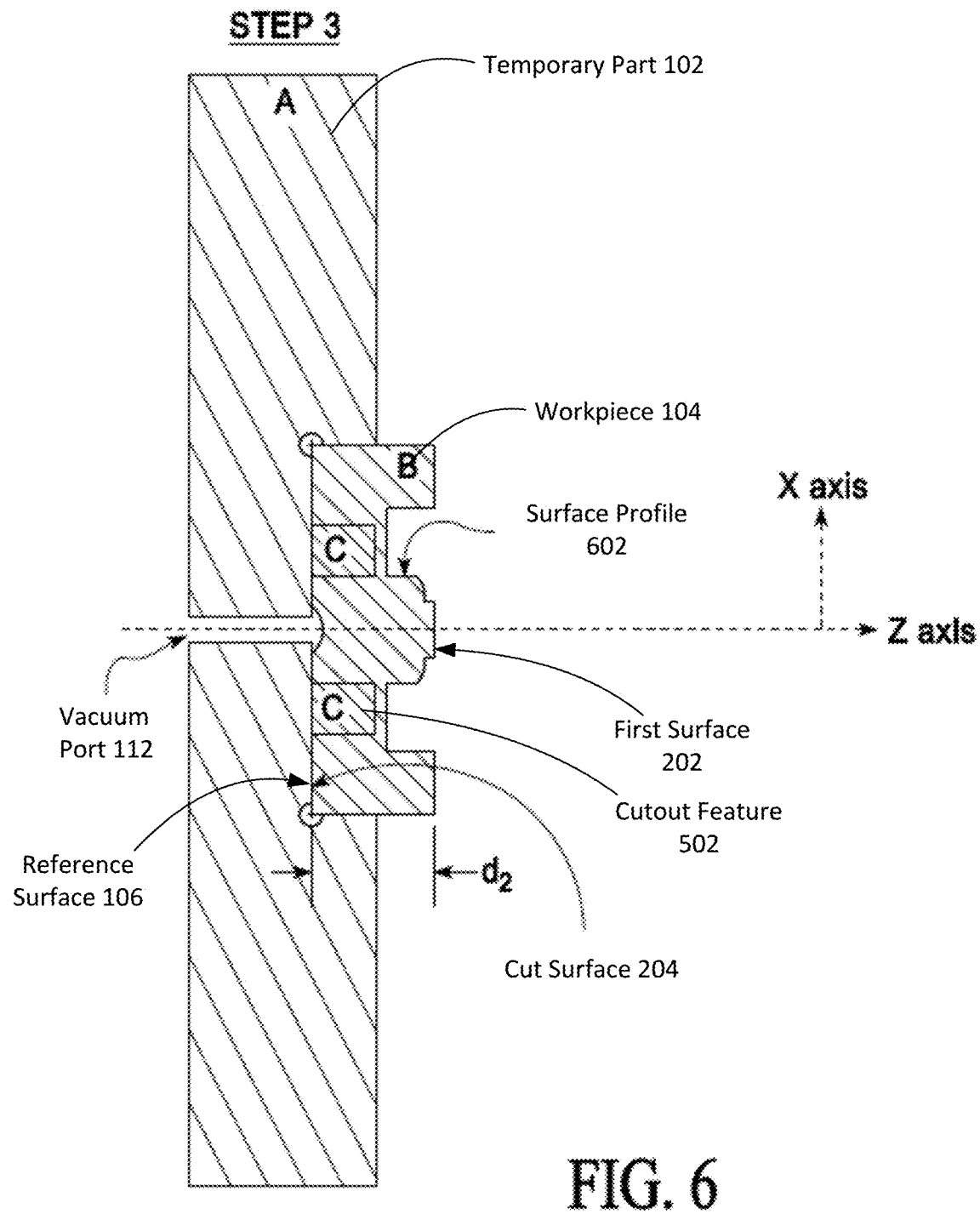
Figure 7:
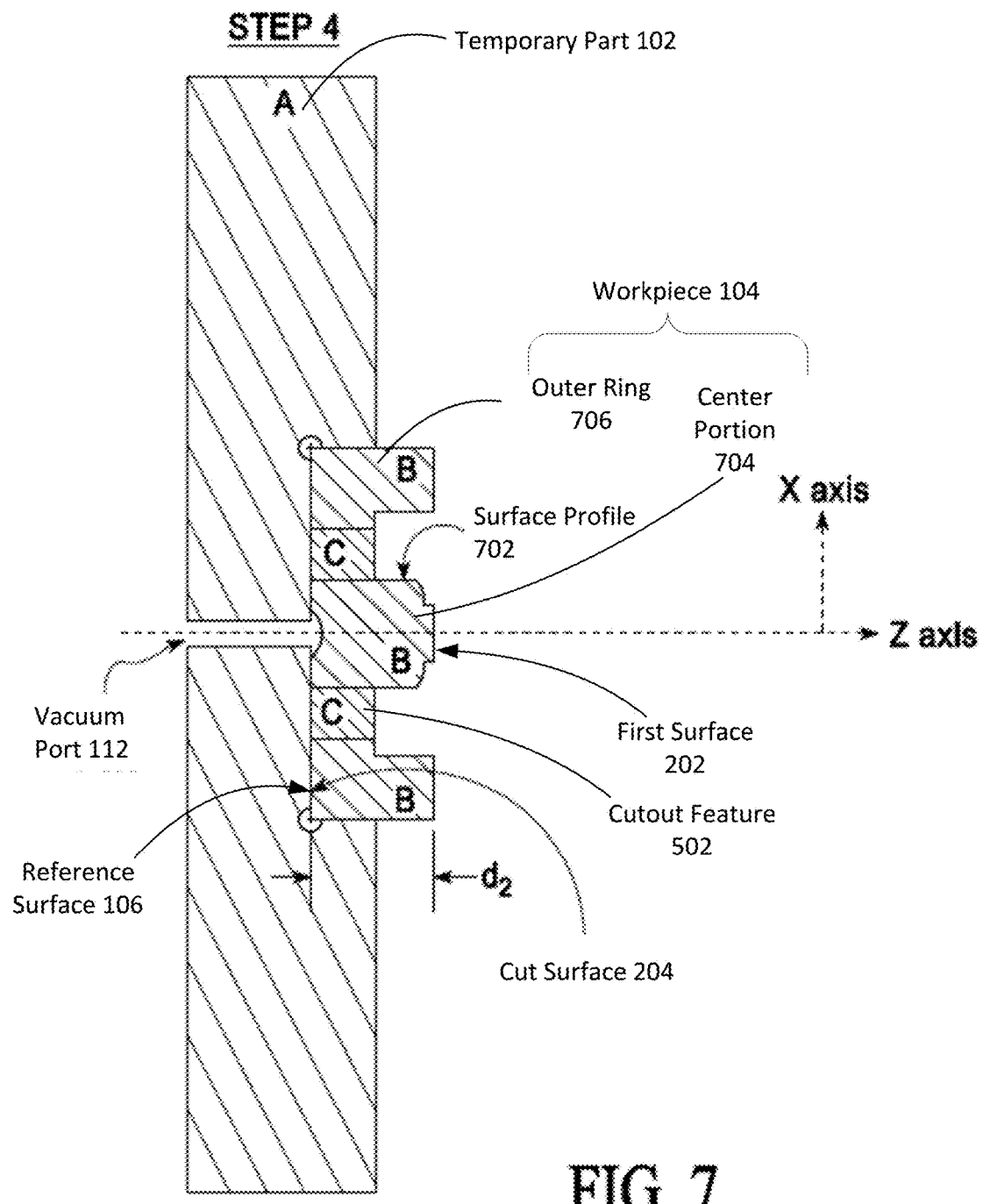

FIGS. 6 and 7 illustrate the workpiece 104 after it has been removed from its position on the temporary part 102, flipped over, and remounted onto the temporary part 102, such that the cut surface 204 is aligned with and directly adjacent to the reference surface 106 on the temporary part 102. The diamond turning tip is then able to shape one or more features from the first surface 202 to form a surface profile 602 onto the first surface, while maintaining the desired length d2 between the surface 202 and the cut surface 204. As such, the center portion of the workpiece 104 is machined on all sides, while retaining its critical length dimension d2. In some embodiments, the filler material within the cutout features 502 provides support to the cut surface 204 when the cut surface 205 of the workpiece 104 is placed directly adjacent to the reference surface 106.

In FIG. 6, the surface profile 602 comprises one or more cutout features formed from the first surface 202 that are not deep enough to reach the cutout features 502 formed on the opposite surface 204 and the filler material within.

On the other hand, in FIG. 7, the cutout features formed as part of the surface profile 702 reach the cutout features 502 on the other side and the filler material within, separating the workpiece 104 into two different components: center portion 704 and an outer ring 706, separated by the filler material within the cutout features 502. Upon removal of the workpiece 104 from the temporary part 102, the filler material may be dissolved or otherwise removed from the cutout features 502, allowing for the center portion 704 and outer ring 706 to be separated from each other. In some embodiments, the finished component comprises the center portion 704 of the workpiece, which has been machined on all sides by the diamond turning machine. As such, this method allows for the manufacture of components shaped on all sides, without having the change the size or shape of the recess 108 formed in the temporary part 102.

The diamond turning processes described above allow for manufacture of a diamond turned part with high length or thickness accuracy. Once the reference surface is created on the temporary part, a cut surface may be made on the workpiece at a specified z distance with high accuracy. For example, length accuracy better than ±1 um has been demonstrated in PMMA parts roughly 1 mm long and 1 mm in diameter. The techniques described herein can be applied to any material that can be machined by ultra-precision diamond turning. The techniques described herein for diamond turning may also be applied to work with conventional lathes for improved workpiece length accuracy.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for diamond turning a workpiece on a diamond turning machine comprising a chuck and a diamond tip installed on the diamond turning machine, the method comprising:
    mounting a temporary part onto the chuck of the diamond turning machine;
    using the diamond turning machine to control the diamond tip to diamond turn a reference surface on the temporary part;
    while the temporary part remains mounted on the chuck and the diamond tip remains installed on the diamond turning machine:
        mounting a workpiece onto the temporary part; and
        using the diamond turning machine to control the diamond tip relative to the reference surface to diamond turn a surface profile on the workpiece.

2. The method of claim 1, where the diamond tip diamond turns the surface profile to achieve a specified thickness for the workpiece.

3. The method of claim 2, where the workpiece is diamond turned to a thickness tolerance of 1 µm or less.

4. The method of claim 1, where diamond turning the reference surface on the temporary part comprises:
    diamond turning a recess into the temporary part, a bottom of the recess serving as the reference surface.

5. The method of claim 4, where mounting the workpiece onto the temporary part comprises:
    mounting the workpiece into the recess, the recess also laterally positioning the workpiece.

6. The method of claim 4, where the recess has a bottom and sidewalls, the bottom is substantially perpendicular to an axis of rotation for the diamond turning, and the sidewalls are substantially parallel to the axis of rotation.

7. The method of claim 4, where the recess has a bottom and sidewalls, and the temporary part further includes corner relief features at a junction of the bottom and sidewalls.

8. The method of claim 4, where the diamond tip diamond turns the surface profile to achieve a specified thickness for the workpiece, and the recess has a depth that is less than the specified thickness.

9. The method of claim 1, further comprising:
    before diamond turning the surface profile on the workpiece, diamond turning a cut surface on a side of the workpiece that is opposite the surface profile, where mounting the workpiece onto the temporary part comprises mounting the workpiece with the cut surface of the workpiece contacting the reference surface of the temporary part.

10. The method of claim 9, where:
    diamond turning the cut surface comprises, while the temporary part remains mounted on the chuck and the diamond tip remains installed on the diamond turning machine:
        mounting the workpiece onto the temporary part with the side opposite the surface profile facing the diamond tip; and
        controlling the diamond tip relative to the reference surface to diamond turn the cut surface on the workpiece.

11. The method of claim 10, where mounting the workpiece onto the temporary part further comprises cleaning the reference surface and the cut surface after diamond turning the cut surface and before mounting the workpiece onto the temporary part.

12. The method of claim 9, where diamond turning the cut surface is performed using a different diamond tip, on a different diamond turning machine and/or without the temporary part.

13. The method of claim 9, where diamond turning the cut surface further comprises diamond turning a recess into the cut surface, the method further comprising:
    filling the recess with filler material to planarize the cut surface before mounting the workpiece with the cut surface of the workpiece contacting the reference surface of the temporary part; and
    releasing the filler material after diamond turning the surface profile.

14. The method of claim 13, where diamond turning the surface profile on the workpiece cuts through the workpiece to the filler material in at least one location to produce a hole in the workpiece.

15. The method of claim 13, where diamond turning the surface profile on the workpiece cuts through the workpiece to the filler material to separate the workpiece into two or more pieces.

16. The method of claim 13, where the filler material is a curable, soluble material.

17. The method of claim 1, where the chuck is a vacuum chuck, the temporary part is mounted onto the vacuum chuck by suction from the vacuum chuck, the temporary part includes a vacuum port that extends the suction to the reference surface, and the workpiece is mounted onto the temporary part by suction from the vacuum port.

18. The method of claim 17, where diamond turning the temporary part further comprises diamond turning a spiral groove on the reference surface connected to the vacuum port, the workpiece mounted onto the temporary part by suction through the spiral groove.

19. The method of claim 1, where the temporary part and the workpiece comprise a poly(methyl methacrylate) material.

20. The method of claim 1, where the workpiece is mounted onto the temporary part using at least one of magnetic attraction, electrostatic attraction, and interference fit.

* * * * *